United States Patent Office 2,950,951
Patented Aug. 30, 1960

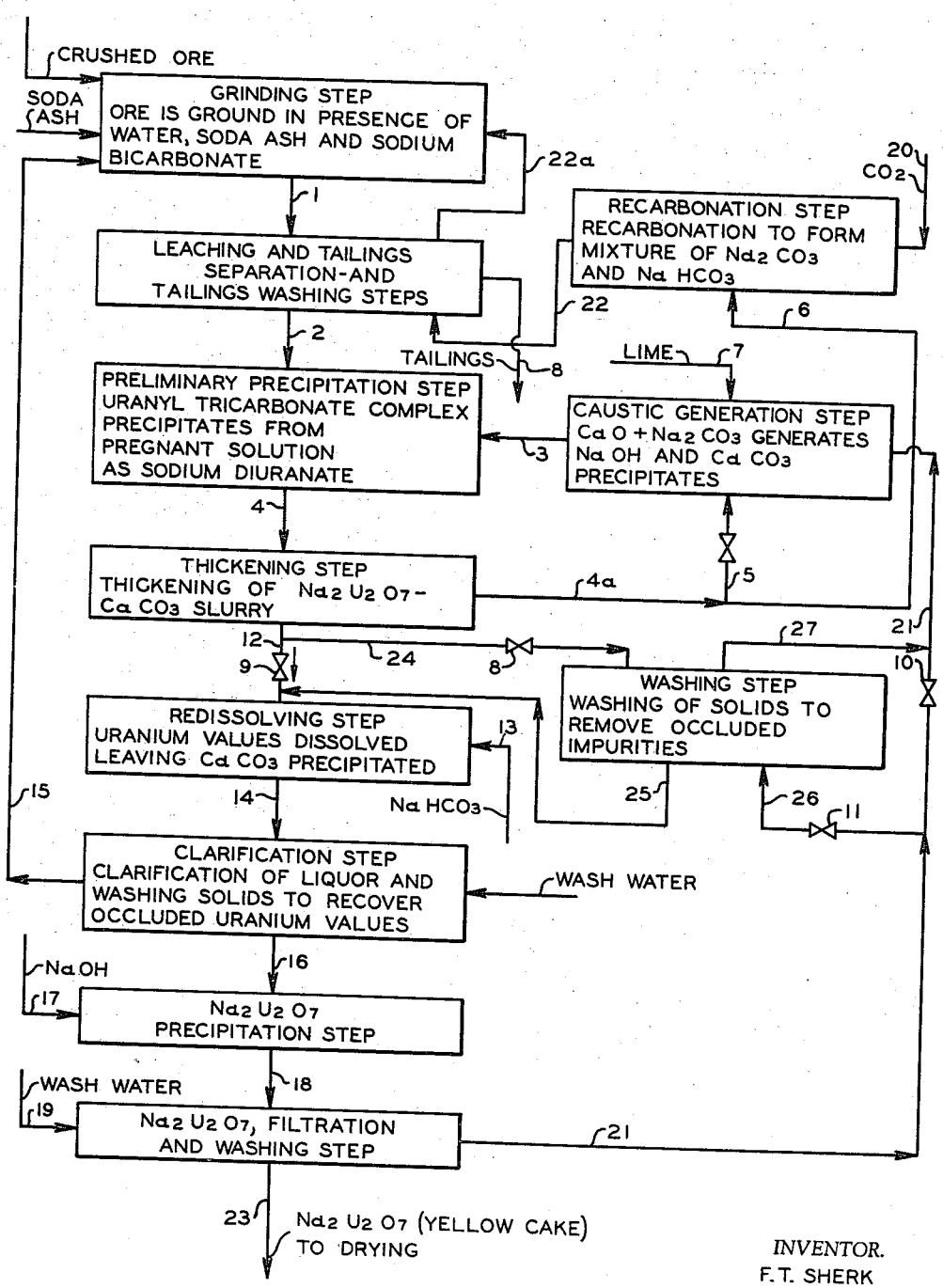

2,950,951
CARBONATE LEACH URANIUM MILLING PROCESS

Fred T. Sherk, Bartlesville, Okla., assignor to Phillips Petroleum Company, a corporation of Delaware Filed July 28, 1958, Ser. No. 751,256

6 Claims. (Cl. 23—14.5)

This invention relates to a carbonate leach uranium milling process. The invention is a modification of the well known carbonate leach process and comprises a series of mutually interdependent steps, including replacement of most of the caustic soda employed in the carbonate leach process with low cost lime and soda ash, a preliminary precipitation of the dissolved, leached uranium values from the leach liquor and the redissolving thereof before final clarification of the liquor and precipitation of the uranium.

The well known carbonate leach process for extracting uranium values from ore briefly comprises wet grinding the crushed ore in the presence of sodium carbonate and sodium bicarbonate, oxidizing and leaching a resulting ore slurry containing about 50 percent solids to dissolve the uranium values as the sodium uranyl tricarbonate complex, filtering the pregnant liquor containing the uranium values to remove the tailings therefrom, clarifying the pregnant liquor, and precipitating the uranium therefrom as sodium diuranate by adding sodium hydroxide, and filtering the precipitate from the liquid (barren liquor) which is recycled to the process.

In the foregoing prior art process, the leach liquor is very dilute, since as is well known, the concentration of uranium in an ore is quite low. Thus, very large quantities of water must be handled in the filtration equipment and in the clarification equipment, requiring filtration and clarification equipment of commensurate size. Also, in the foregoing process large amounts of relatively expensive sodium hydroxide are required for the precipitation of the uranium from the leach liquor.

It is an object of the invention to provide an improved process for milling uranium ores employing a carbonate leach, whereby the consumption of caustic soda is reduced, and whereby the volume of leach liquor is greatly reduced early in the process. Other objects, as well as aspects and advantages inherent in the process, will become apparent upon a study of the accompanying disclosure and drawing.

The method of the invention involves a preliminary precipitation step wherein the pregnant or uranium bearing solution is mixed with a slurry of calcium carbonate in a sodium carbonate-sodium hydroxide solution. This slurry is formed by the addition of lime to the barren solution resulting from the separation of the barren liquor from the final sodium diuranate precipitate. The addition of lime to this recycle barren solution causes the formation of sodium hydroxide and precipitated calcium carbonate. The resulting calcium carbonate slurry containing the caustic soda when mixed with the pregnant solution causes the precipitation of sodium diuranate. The combined precipitates are separated from the major portion of the liquor, thus concentrating the uranium values, and the primary barren liquor resulting from the separation is recarbonated and recycled to the process. The concentration of uranium values is commonly 20 to 50 times the concentration of the original pregnant solution. The precipitates along with some small amount of liquor are subjected to recarbonation, thus dissolving the sodium diuranate. This resulting pregnant liquor is of a much higher concentration than the original liquor. It is processed to produce a clarified, highly concentrated pregnant solution and a slurry of the calcium carbonate. The concentrated pregnant solution is then treated with caustic soda to again precipitate the uranium as sodium diuranate, which is removed from the secondary barren solution formed as yellow cake product. The secondary barren solution can then be recycled to the lime mixing step.

The invention will be better understood in connection with the following description of the process diagram shown in the accompanying drawing. This drawing is, of course, a simplification, with no indication being given of the types of equipment, and method of operation of the various pieces of apparatus involved. Conventional apparatus can be employed, however.

Beginning in the upper left-hand corner of the diagram crushed uranium bearing ore and soda ash are introduced to the grinding step wherein the ore is ground to a fine condition in the presence of water, soda ash and sodium bicarbonate. Calcium carbonate is also present, being introduced in recycle stream 15. Part of the sodium carbonate and sodium bicarbonate are introduced through line 22A in the form of recarbonated primary barren solution. The resulting slurry passes through line 1 to the leaching, tailings separation and tailings washing steps. In the leaching step the slurry usually contains a concentration in the neighborhood of 50 weight percent solids, often from 40–60 weight percent. In this step the slurry is heated to a temperature within the range from 160 to 250° F., usually from about 180 to 210° F., and is oxidized and agitated with air which is introduced to the leaching vessel for several hours, usually about 40–70 hours. Under these conditions, as is well known in the art, the uranium is leached as the sodium uranyl tricarbonate complex, $Na_4UO_2(CO_3)_3$. After the uranium values have been leached from the ore the tailings are separated therefrom and washed, as indicated in the drawing. Recarbonated barren liquor in line 22 is employed to wash the tailings. It should be mentioned that the separated tailings are not dry and contain some barren liquor. This is not only necessary but is actually often advantageous since it represents a bleed of barren solution, without which a buildup in the system of impurities would occur. The pregnant solution resulting from the leaching step in line 2 then passes to a preliminary precipitation step wherein the pregnant liquor is mixed with a slurry of calcium carbonate containing sodium carbonate and sodium hydroxide introduced to the preliminary precipitation step through line 3. This step results in the precipitation of the uranium values as sodium diuranate in admixture with the precipitated calcium carbonate. This mixture is passed through line 4 to a thickening step wherein the major portion of the primary barren solution is separated from the sodium diuranate-calcium carbonate slurry to form a thickened slurry. At least a major portion of this primary barren solution is passed through lines 4 and 6 to a recarbonation step wherein the solution is recarbonated, such as by the addition of carbon dioxide to line 20. Usually, this carbon dioxide is contained in flue gases. The stream in line 3 is produced by a caustic generation step in which lime introduced in line 7 is admixed with the secondary barren solution introduced in line 21. The sodium carbonate in line 21 reacts with the calcium oxide to form sodium hydroxide and precipitate calcium carbonate. If necessary, a portion of the primary barren solution in line 4 from the thickening step is introduced through line 5 to the caustic generation step. There must be enough sodium carbonate introduced in this step to react with all of the calcium oxide to form calcium carbonate. In turn, the calcium oxide must be introduced in an amount so that the resulting sodium hydroxide will be present in a quantity which will neutralize the sodium bicarbonate in stream 2 and also leave an excess of sodium hydroxide so that the resulting barren solution in line 4 contains from 2 to 20 grams per liter of free sodium hydroxide, preferably from 6 to 12 grams per liter of sodium hydroxide, in order to properly precipitate the sodium diuranate.

There are several advantages to the foregoing caustic generation step employing lime. In the first place, this step results in replacement of most of the sodium hydroxide employed in the prior art sodium carbonate leach process with the much less expensive lime. Secondly, when the calcium carbonate precipitates there can be coprecipitated therewith impurities which are present in most uranium ores. Such impurities are eventually purged from the system with the calcium carbonate which is removed from the system in the tailings since the calcium carbonate is never redissolved in the process.

In the thickening step following the preliminary precipitation step a major portion of the barren liquor is removed, usually so that the resulting slurry contains at least 1 weight percent uranium, expressed as $U_3O_8$. This concentration of the uranium values greatly simplifies and reduces the cost of the balance of the process. Assuming that valves 9 and 10 are open and that 8 and 11 are closed the thickened slurry passes through line 12 to a redissolving step wherein the uranium values are redissolved by recarbonation, leaving the calcium carbonate precipitated. The recarbonation can be effected, for instance, by the addition of sodium bicarbonate through line 13. The resulting highly concentrated, pregnant solution is passed through line 14 to a clarification step wherein the pregnant liquor is clarified, the solid calcium carbonate being removed and washed to recover any occluded uranium values. The calcium carbonate is returned as a slurry to the grinding step through line 15 since it contains some soda ash which should be recycled to the process. The solid calcium carbonate is eventually purged from the system with the tailings, as before mentioned. The clear, relatively highly concentrated pregnant liquor, usually containing at least 1 weight percent dissolved uranium expressed as $U_3O_8$, is passed through line 16 to the final precipitation step wherein sodium diuranate is precipitated by the addition of caustic added through line 17. Again, in order to properly precipitate the sodium diuranate caustic is added in an amount which will neutralize the sodium bicarbonate present in stream 16 and still leave an excess of 2 to 20, preferably 6 to 12, grams per liter of solution. Since the pregnant solution to which the caustic must be added is very highly concentrated compared to the pregnant solution obtainable in the prior art carbonate leach process, there is much less sodium bicarbonate to be neutralized and therefore a much smaller amount of sodium hydroxide is employed in the process of the invention. In the preliminary precipitation step of the invention which does require a large amount of caustic, this caustic is generated in the system by the addition of the much less expensive lime, as before mentioned.

From the final sodium diuranate precipitation step the resulting slurry passes through line 18 to the normal sodium diuranate filtration and washing steps, wash water being introduced through line 19. The liquid separated from the sodium diuranate or yellow cake is secondary barren solution which passes from this step through line 21. The solid sodium diuranate (yellow cake) is passed through line 23 to a drying step.

Various modifications of the foregoing process can, of course, be practiced. For instance, in the redissolving step the slurry can be carbonated by introducing carbon dioxide instead of sodium bicarbonate through line 13. Alternatively, a portion of the secondary barren solution in line 21 can be recarbonated with carbon dioxide and added through line 13 to provide the sodium bicarbonate for the redissolving step.

In one embodiment the invention involves a further advantageous modification in which valves 9 and 10 are closed and valves 8 and 11 are open. In the preliminary step of precipitation of sodium diuranate from the pregnant solution in line 2, some metallic impurities, such as vanadium values, precipitate in part, but are in part left in solution. It is desirable that the concentration of these other metallic values be as low as possible in the final yellow cake product. The thickened slurry in line 12 contains in solution some of these metallic values, such as vanadium. By interposing a washing step between the thickening and redissolving step, a large portion of the dissolved metallic impurities can be removed from the solids by dilution of the thickened slurry and reconcentration of the slurry to the desired value, thus washing the occluded impurities from the thickened solids. Slurry passes through line 12, line 24 and valve 8 to this washing step, the washed, thickened slurry flowing back to line 12 through line 25. The slurry is diluted and washed in this step with barren solution flowing in line 21 through line 26 and valve 11, the barren solution containing the occluded impurities then passing back to line 21 through line 27. These impurities are eventually lost, in part, by passing as a bleed with the portion of the liquor which is lost with the tailings. Thus, a further advantage of the present process is in the ability to produce a purer yellow cake product because of this purge or bleed of impurities.

In another variation only a portion of the secondary barren solution in line 21 is recycled to the caustic generation step while the remainder is recycled to the recarbonation step. Or the entire secondary barren solution in line 21 can be recycled to the recarbonation step instead of the caustic generation step.

In an example of the process of the invention the crushed uranium ore feed contains about 6.5 pounds of uranium as $U_3O_8$ per ton (2,000 pounds) of ore. The process is effected as described in connection with the drawing, with valves 8 and 11 being closed and valves 9 and 10 being open. The leaching step is effected as previously described employing a leaching time of 60 hours and a temperature of about 190° F. Amounts of the various materials in the various streams per ton of original ore are shown in Table I.

Table 1

| Stream No. | 2a | 3 | 4 | 5 | 6 | 7 | 12 | 13 | 14a | 15 |
|---|---|---|---|---|---|---|---|---|---|---|
| $H_2O$ | 2,000 | 1,000 | 3,000 | 900 | 2,020 |  | 80 |  | 80 | 10 |
| $Na_2CO_3$ | 84.65 | 0.12 | 121.00 | 36.30 | 81.47 |  | 3.23 |  | 5.19 | 0.13 |
| $NaHCO_3$ | 28.70 |  |  |  |  |  |  | 2.69 | 1.14 | 0.03 |
| $NaOH$ |  | 41.28 | 27.61 | 8.28 | 18.59 |  | 0.74 |  |  |  |
| $Na_2SO_4$ | 400.00 | 193.41 | 593.41 | 178.02 | 399.57 |  | 15.82 |  | 15.82 | 0.40 |
| $CaO$ |  |  |  |  |  | 22.52 |  |  |  |  |
| $CaCO_3$ |  | 40.21 | 40.21 |  |  |  | 40.21 |  | 40.21 | 40.21 |
| $Na_2U_2O_7$ | 7.65 | 0.11 | 7.76 | 0.10 | 0.22 |  | 7.43 |  | 7.43 | 0.19 |
| $CO_2$ |  |  |  |  |  |  |  |  |  |  |

| Stream No. | 16a | 17 | 18 | 19 | 20 | 21 | 22 | 23 | 28b | Soda Ash |
|---|---|---|---|---|---|---|---|---|---|---|
| $H_2O$ | 85 | 5 | 90 | 16 |  | 100 | 2,020 | 6 | 2,500 |  |
| $Na_2CO_3$ | 5.06 |  | 6.46 |  |  | 6.45 | 88.50 | 0.01 | 8.23 | 37.43 |
| $NaHCO_3$ | 1.11 |  |  |  |  |  | 27.90 |  | 2.62 |  |
| $NaOH$ |  | 1.36 | 0.83 |  |  | 0.83 |  | trace |  |  |
| $Na_2SO_4$ | 15.42 |  | 15.42 |  |  | 15.39 | 399.56 | 0.03 | 40.20 |  |
| $CaO$ |  |  |  |  |  |  |  |  |  |  |
| $CaCO_3$ |  |  |  |  |  |  |  |  | 40.21 |  |
| $Na_2U_2O_7$ | 7.24 |  | 7.24 |  |  | 0.01 | 0.22 | 7.23 | 0.03 |  |
| $CO_2$ |  |  |  |  | 35.07 |  |  |  |  |  | a In these streams the carbonate and uranium values are shown as equivalent amounts of $Na_2CO_3$, $NaHCO_3$, and $Na_2U_2O_7$, but the uranium is actually present as the soluble uranium tricarbonate complex.

b The figures for this stream omit the solid tailings or gangue from the original ore.

The advantages of the preliminary precipitation and thickening steps and of the caustic generation step by means of lime will become more apparent upon a study of this table. Thus, in the carbonate leach process of the prior art caustic soda is added to the very dilute stream 2, while in the present process the addition of a great deal less caustic is required since it is added only in stream 17 to stream 16 in which the uranium values are much more highly concentrated.

As will be evident to those skilled in the art, various modifications of this invention can be made or followed in the light of the foregoing disclosure and discussion without departing from the spirit and scope of the disclosure or from the scope of the claims.

What is claimed is:

1. In a process for recovering uranium from an aqueous leach liquor containing dissolved sodium carbonate, dissolved sodium bicarbonate and uranium in the form of dissolved sodium uranyl tricarbonate complex, the steps comprising precipitating the uranium values from said leach liquor as sodium diuranate, concentrating the uranium in the liquor by removing a major portion of the liquor as a primary barren solution from the precipitate, leaving a concentrated uranium slurry, redissolving the uranium in the remaining liquor associated with the precipitate by carbonation of said slurry to form a concentrated pregnant solution containing sodium uranyl tricarbonate complex, clarifying said concentrated pregnant solution to remove solids therefrom, and precipitating said uranium from said concentrated pregnant solution by adding sodium hydroxide thereto to form solid sodium diuranate and a secondary barren solution, separating said solid sodium diuranate from said secondary barren solution, mixing at least a portion of at least one of said primary and secondary barren solutions with lime to form a slurry of calcium carbonate in a solution containing sodium hydroxide, and mixing said last-named slurry with said leach liquor to effect the said precipitating of sodium diuranate therefrom.

2. Process of claim 1 including the step of washing the solids in said concentrated uranium slurry with said secondary barren solution prior to said redissolving step.

3. In a process for recovering uranium from an ore which comprises oxidizing an aqueous slurry of comminuted ore in the presence of sodium carbonate and sodium bicarbonate to form a pregnant solution containing dissolved uranium, precipitating uranium as sodium diuranate from the pregnant solution by addition of sodium hydroxide, and recovering the precipitated uranium, the improvement which comprises forming a more concentrated pregnant solution before said precipitation by said addition of said sodium hydroxide by a method which comprises the steps of reacting an aqueous solution containing sodium carbonate with lime to form a calcium carbonate slurry containing sodium hydroxide, admixing said slurry and said pregnant solution, thereby precipitating sodium diuranate therefrom, removing aqueous liquor from said slurry and thereafter recarbonating said slurry to redissolve said uranium and form said more concentrated pregnant solution.

4. Process according to claim 1 wherein said concentrated pregnant solution contains at least 1 weight percent dissolved uranium expressed as $U_3O_8$.

5. Process according to claim 1 wherein, in each of the recited uranium precipitating steps, enough of said sodium hydroxide is added, respectively, to each of said leach liquor and said concentrated pregnant solution to neutralize the sodium carbonate therein and still leave, respectively, in said primary barren solution and said secondary barren solution from 2 to 20 grams per liter of free sodium hydroxide.

6. Process according to claim 1 wherein, in each of the recited uranium precipitating steps, enough of said sodium hydroxide is added, respectively, to each of said leach liquor and said concentrated pregnant solution to neutralize the sodium carbonate therein and still leave, respectively, in said primary barren solution and said secondary barren solution from 6 to 12 grams per liter of free sodium hydroxide.

References Cited in the file of this patent

UNITED STATES PATENTS 2,199,697    Fleck                   May 7, 1940
2,830,871    Kaufman et al.         Apr. 15, 1958

OTHER REFERENCES

Michal: "MITG-A51," September 30, 1948, pages 1–24.

Stephens et al.: "Proceedings of the International Conference on the Peaceful Uses of Atomic Energy," vol. 8, August 8–20, 1955, pages 18–25.